Oct. 28, 1958 H. LEIBACH 2,858,173
ELASTIC SHAFT MOUNTING
Filed May 12, 1955 3 Sheets-Sheet 2

INVENTOR
HEINRICH LEIBACH
BY Dicke and Craig.
ATTORNEYS.

Oct. 28, 1958  H. LEIBACH  2,858,173
ELASTIC SHAFT MOUNTING
Filed May 12, 1955  3 Sheets-Sheet 3

INVENTOR
HEINRICH LEIBACH
BY Dicke and Craig.
ATTORNEYS.

United States Patent Office 2,858,173
Patented Oct. 28, 1958

2,858,173

ELASTIC SHAFT MOUNTING

Heinrich Leibach, Munich-Obermenzing, Germany, assignor to Daimler-Benz Aktiengesellschaft, Stuttgart-Unterturkheim, Germany Application May 12, 1955, Serial No. 507,928

Claims priority, application Germany May 13, 1954

13 Claims. (Cl. 308—9)

The present invention relates to an elastic bearing for supporting a rotatable shaft, and particularly one mounted substantially horizontally and running at a very high speed.

The application of highly resilient bearing structures which are operative merely in a radial direction in order to support rotating shafts of relatively low critical speeds usually does not afford any difficulties since the weight of the shaft and a possible flywheel thereon acts in a vertically downward direction and restoring force thus always returns the bearing itself automatically to its accurate central position. Different conditions prevail in horizontal shafts running at relatively low critical speeds. There the tendency exists that the bearing itself and thus also the shaft with a flywheel thereon will in accordance with the resilience of the spring mounting be forced downwardly to a noticeable and often inadmissible extent by the weight of the structure. Resetting of the bearing, as well as the shaft and its flywheel, to the central position may be carried out, for example, prior to the operation of the shaft, by suitable set screws. Such a known resetting device is, however, not suitable in many instances since the lowering action of the bearing and other mentioned parts may be subject to variations during the rotation of the shaft so that the original adjustment of the set screws will soon prove to be inaccurate.

A principal object of the present invention is to eliminate the aforementioned disadvantage of the prior structures of this kind and to devise a restoring or stabilizing device which operates automatically and very reliably.

Another object of the present invention and one to accomplish the object previously mentioned is to devise a hydraulic restoring or stabilizing device which automatically restores the bearing structure to its normal or central position whenever the bearing should be exceeding a certain resilient or oscillating movement, thus automatically stabilizing the movement and rotation of the shaft.

Another object of the present invention is to provide a restoring or stabilizing device as described so as to be active in two directions which are vertically disposed to each other, that is, for example, in a direction vertically as well as horizontally to the bearing.

A feature of the hydraulic restoring or stabilizing device according to the present invention consists in the provision of a ring which is mounted so as to be movable at least in a vertical direction within the plane of the bearing and which resiliently encloses and supports the bearing in such direction. Such ring preferably continues in a vertical direction and below the bearing by means of a piston rod into a control piston of a hydraulic control device which is designed to control the height or level of the ring relative to a stationary outer bearing housing.

According to a further embodiment of the invention, such ring may also continue at a right angle to the mentioned control piston into a second control piston of a similar control device which returns the bearing to its normal central position in the event it is advisable that the ring be connected to both piston rods so as to be movable transversally in such a manner that the displacing movement of the ring which is permissible by one piston rod cannot be transmitted to the other rod.

Further objects, features, and advantages of the present invention will appear from the following detailed description thereof and the accompanying drawings, wherein—

Figs. 2 to 5 show axial cross sections of the hydraulic control of the bearing shown in Fig. 1 in four different positions; while

Figure 1:
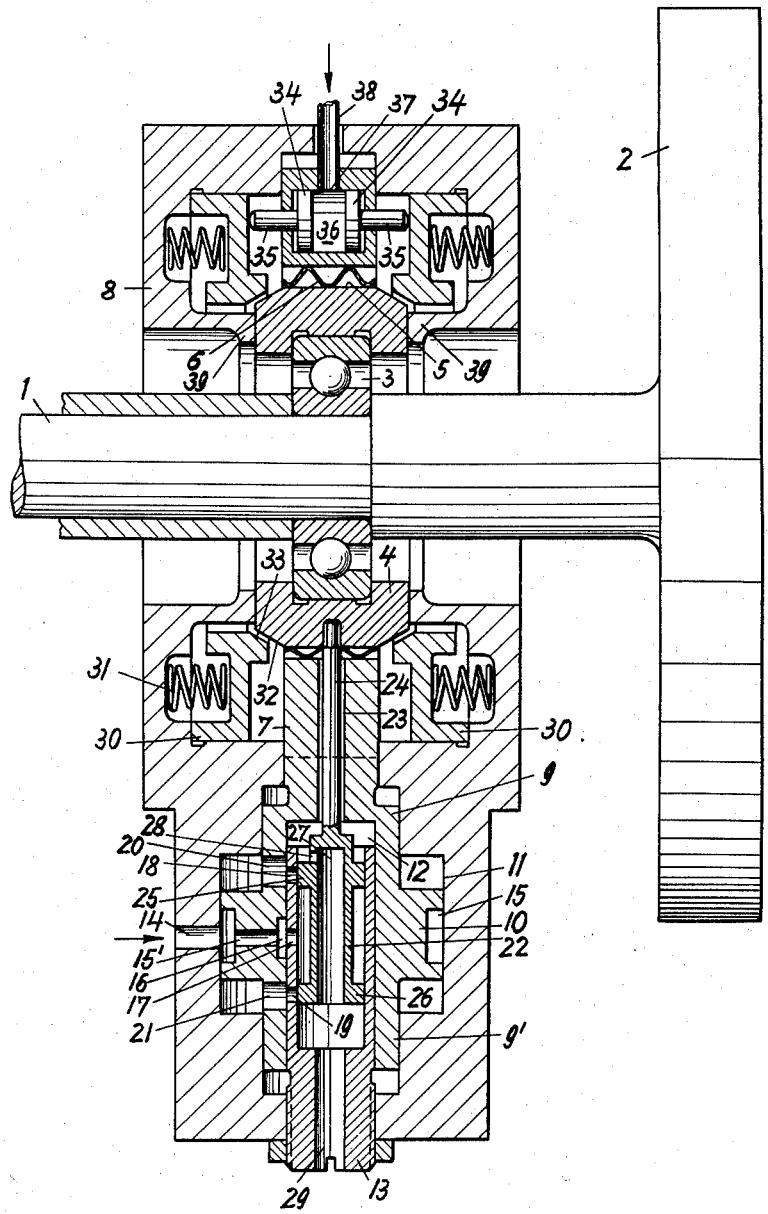
Fig. 1 shows a cross section of the elastic bearing structure according to the invention, such section being taken in an axial direction of the shaft which is supported thereby.

Referring to the drawings, the elastic bearing according to the invention comprises the shaft 1 which carries on its free end a flywheel 2 and is mounted in a ball bearing 3 closely adjacent to such free end, and a bearing ring 4 which tightly encloses the outer race of the ball bearing 3. This bearing ring is surrounded along its outer cylindrical periphery 5 by one or more spring members 6 which are preferably evenly distributed along the pheriphery 5 of the bearing ring 4 and contribute to the elastic mounting of such ring including that of the ball bearing 3 and shaft 1 with flywheel 2 by acting upon a ring 7 which surrounds the bearing ring 4 and forms a part of a hydraulic restoring or stabilizing device which, in turn, is mounted within a stationary housing 8.

As illustrated in Fig. 1, ring 7 of the hydraulic stabilizer is mounted within the housing 8 so as to be adjustable in a vertical direction relative thereto, and is extended below the bearing ring 4 in a vertical direction by means of a piston rod 9 so as to form a piston 10 of a hydraulic control device whereby the height or level of ring 7 relative to the stationary housing 8 may be controlled. Although in the specific embodiment shown in the drawing, piston rod 9 constitutes an extension of ring 7, the two members may also form two separate elements.

The hydraulic control device further consists of a cylindrical recess or chamber 11 within the housing 8 in which the control piston 10 is slidably mounted and from which it extends both upwardly and downwardly so as to form a piston rod 9 of equal cross-sectional area both above and below piston 10. The free lower end 9' of piston rod 9 has mounted therein a bushing 13 which is secured to the stationary housing 8 and closely fitted within a socket 12 which extends in an axial direction of the piston rod 9. The bushing 13 has a central socket like bore extending entirely therethrough and open at its lower end.

Substantially at the central position of the control piston 10, the housing 8 is provided with a transverse bore 14 which terminates at, and extends into an outer annular recess 15 in the control piston 10 through which it communicates through a radial bore 15' and an inner recess 16 with the socket 12 of the piston 10. Recess 16 is extended in a longitudinal direction so that the connection from the transverse bore 14 through the outer annular recess 15 and the bore 15' to a transverse bore 17 in the inner bushing 13 will be maintained even though piston 10 has moved to its upper or lower limits.

Above and below the bore 17, the stationary bushing 13 is provided with a further transverse bore 18 and 19, respectively, and these bores communicate in the outward direction with adjacent transverse bores 20 and 21, respectively, in the piston rod 9 which terminate into the cylinder 11 immediately above or below the actual control piston 10. The transverse bores 20 and 21 are likewise made of such a size that the connection between them and the adjacent bores 18 or 19 to the cylinder 11 will be maintained at all times even though the control piston be in its highest or lowest position.

The bushing 13 further contains an axially movable control slide 22 which extends downwardly from the lower end of a slide rod 24 through an axial bore 23 in the piston rod 9 and the annular portion 7 thereof, and is solidly connected through such slide rod 24 to the ring 4 of the bearing 3. The control slide 22 is guided within the bushing 13 merely by two collars 25 and 26 which are placed at such a distance from each other and at such a level of the slide 22 that they will cover the bores 18 and 19 of the bushing 13 at the particular time when the bearing ring 4 is in its medium position. When the bearing ring 4 has reached the exact medium position, the two collars 25 and 26 will cover the bores equally in both directions so that the bearing 3, 4 can oscillate to the extent as required by shaft 1 and flywheel 2, and the inner openings of bores 18 and 19 will by such minor oscillations not be uncovered by the control slide 22.

The control slide 22, similar as the piston rod 9, is provided with an axially extending socket 27 which is drilled in from below and closed at its upper end which is located a short distance above the upper collar 25. Directly above the collar 25, socket 27 is provided with a transverse bore 28 through which it communicates with that part of the axial socket bore 12 which is located outside and above the control slide 22.

The hydraulic control device is further connected in a manner not shown in the drawing by means of the transverse bore 14 in housing 8 with the feed line of an oil pump (not shown) and by the lower opening 29 of the bushing 13 with an oil return line for leading the oil which has passed through the device back to the oil pump.

The bearing ring 4 which encloses the actual bearing 3, and ring 7 are faced on both sides by brake rings 30 which are slidably guided in the housing 8 so as to be movable in a direction parallel to shaft 1. Each brake ring 30 has conical inner surfaces 33 which are pressed from the respective sides laterally against the corresponding conical surfaces 32 of the bearing ring 4 by means of coil spring 31 mounted in suitable recesses in the housing 8. Bearing ring 4, as well as bearing 3 will thus be resiliently maintained in its central position relative to housing 8. Ring 7 further contains a cylinder 36 which extends in a direction parallel to shaft 1 and has slidably mounted therein a pair of pistons 34, the piston rods 35 which extend laterally outward from cylinder 36 and ring 7 in opposite directions. The central part of cylinder 36 is connected through an opening 37 with a feed line 38 through which oil may be supplied to cylinder 36 under pressure.

The operation of this simple locating device for maintaining the bearing in its central position, for example, when passing through a critical speed of rotation of the shaft 1, will be clearly apparent from Fig. 1. If the pistons 34 are moved toward the two ends of the cylinder 36 by the oil pressure in cylinder 36, the two piston rods 35 will act upon the two brake rings 30 and maintain the latter at such a distance from the bearing ring 4 that the latter can adjust itself resiliently through springs 6 to its central position.

Finally, on both sides of the bearing ring 4 the housing 8 is extended so as to abut against the same, and there forms annular flanges 39 which together guide the bearing ring 4 so as to fix its location in the axial direction of shaft 2 while being freely moveable in a direction within the plane of the bearing.

Figure 2:
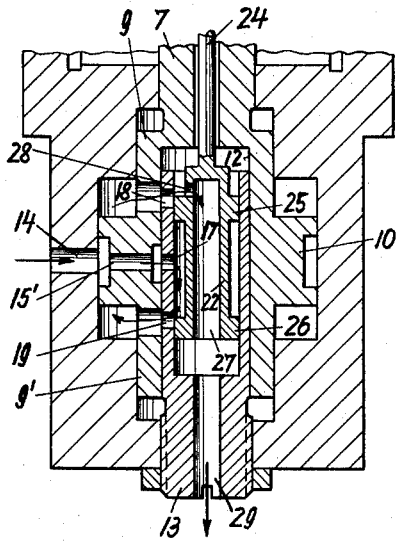
Figure 3:
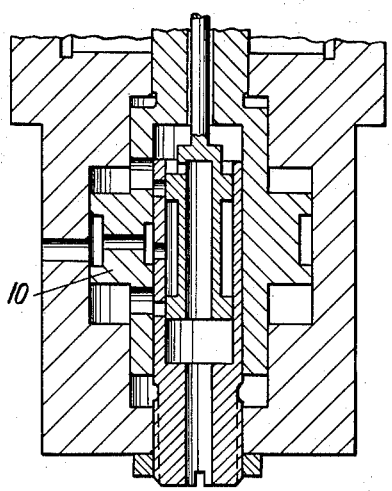

The operation of the hydraulic stabilizing device of the elastic bearing according to the present invention is as follows:

If shaft 1 and thus also the bearing ring 4 including bearing 3 and control slide 22 sink from the central position shown in Fig. 1, for example, to the lower position shown in Fig. 2, the compressed oil or other pressure medium may pass in the direction shown by the arrows through the transverse bore 14, the radial bore 15', the transverse bore 17, and the chamber or recess formed within the bushing 13 on the outside of the control slide 22 between the two collars 25 and 26 thereof, and then through the transverse bore 19 of the bushing 13 to the chamber formed underneath the control piston 10. At the same time, the oil located above the control piston 10 passes through the upper transverse bore 18, the chamber formed above the control slide 22 in the socket 12, and the transverse bore 28 of control slide 22 into the socket 27 in control slide 22, so as to flow off without pressure through the lower opening 29 thereof. The oil pressure acting from below upon the control piston 10 therefore forces the latter upwardly, and lifts the bearing ring 4 and thus also the control slide 22 regardless of the intermediate spring 6 into the position shown in Fig. 3 in which the transverse bores 18 and 19 of bushing 13 are again covered by the collars 25 and 26 of the control slide 22 which has again returned to its middle position. As shown in Fig. 3, the new position of equilibrium differs from the position shown in Fig. 1 merely by the fact that the control piston 10 has now been slightly raised and the spring 6 below the bearing ring 4 has been subjected to increased tension.

Figure 4:
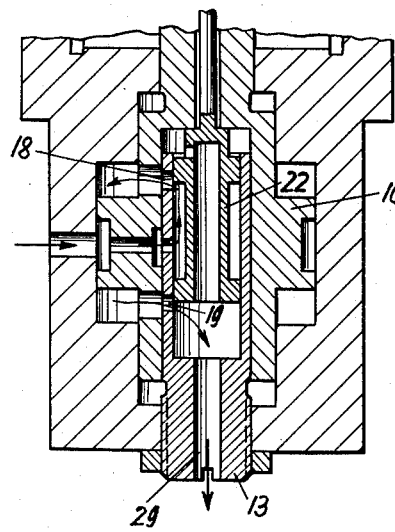
Figure 5:
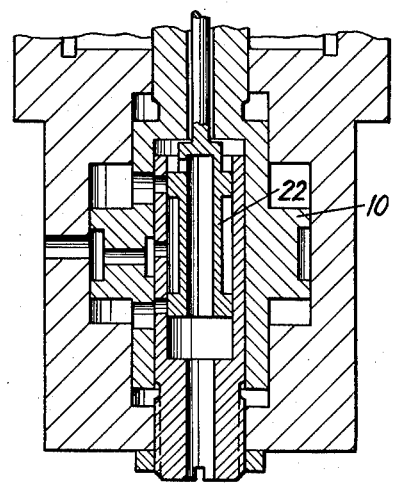

If, as shown in Fig. 4, the control slide 22 is pushed upwardly, for example, by corresponding oscillations of shaft 1 to such an extent that the oil pressure can pass adjacent the upper collar 25 through the transverse bore 18 of bushing 13 to the upper side of the control piston 10, while at the same time the oil below control piston 10 can flow off through the transverse bore 19 of bushing 13 and the lower opening 29 thereof in the direction as indicated by the arrows in Fig. 4, the oil pressure then forces the control piston 10 downwardly, while the bearing ring 4 will be relieved of pressure through the spring 6 until the control slide 22 and shaft 1 will again assume the middle position shown in Fig. 5. As compared with the central position shown in Fig. 3, however, the control piston 10 will now be in a position below that shown in Fig. 1.

While the oscillations of the bearing ring 4 and the corresponding opposite control movements of the hydraulic control device will be possible whenever the brake rings 30 are held sufficiently apart from each other at both sides of the bearing ring 4 by the oil pressure in cylinder 36 and the two pistons 35 and their piston rods 37, bearing ring 4 and thus also the shaft 1 will be rigidly maintained in the central position if the oil contained in cylinder 36 can flow off, for example, through a line connected to feed line 38.

Figure 6:
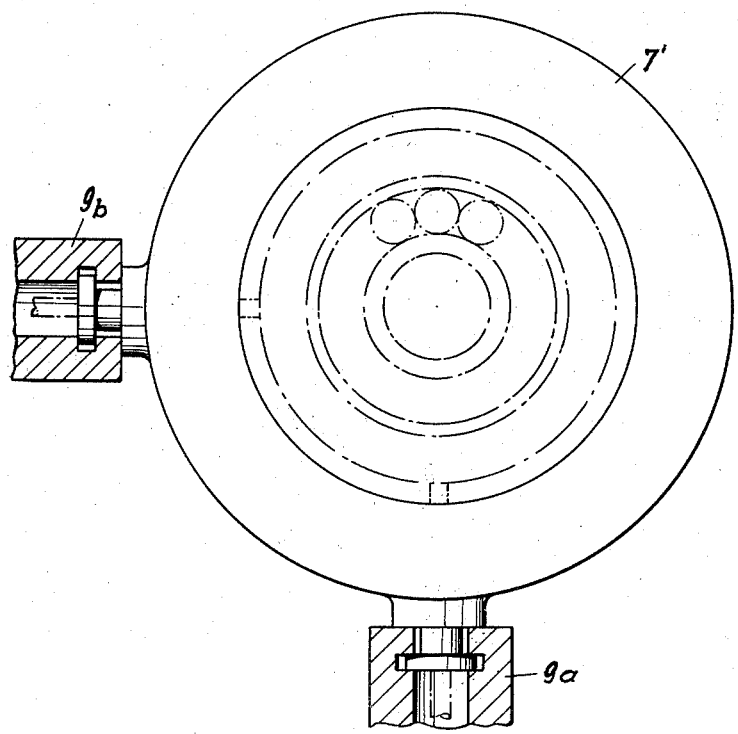
Fig. 6 shows a side view partly in section of a slight modification of the invention showing the application of two hydraulic stabilizing devices of the type as shown in Fig. 1 to the ring enclosing the bearing.

Fig. 6 finally shows a slight modification of the hydraulic control device shown in Fig. 1 insofar as the ring 7' is disposed at right angles to the lower control piston 10 which is not shown in this drawing, or to the piston rod 9a as indicated therein, and to a second control piston 9b of a similar control device which returns the bearing 3, 4 to the desired central position if it has been displaced in a lateral direction. In this double-acting hydraulic stabilizer, ring 7' is connected with both piston rods 9a and 9b so as to be moveable transversally in such a manner that the dislocation of ring 7' which may be permitted by one piston rod 9a or 9b, respectively, will not be transmitted to the other piston rod.

Although my invention has been illustrated and described with reference to the preferred embodiments thereof I wish to have it understood that it is in no way limited to the details of such embodiments or to the specific examples described, but is capable of numerous modifications within the scope of the appended claims.

Having thus fully disclosed my invention, what I claim is:

1. An elastic bearing structure for mounting a substantially horizontal rotatable shaft, comprising a bearing and hydraulic stabilizer means operatively connected directly to said bearing for restoring said bearing automatically to its normal central position only when it is being dislocated by a certain predetermined amount from its central position during the rotation of said shaft 2. An elastic bearing structure as defined in claim 1, wherein said stabilizer means is operative in two different directions vertically to each other.

3. An elastic bearing structure as defined in claim 1, further comprising hydraulic disengageable spring-actuated means for maintaining the location of said bearing in its central position when said shaft rotates at predetermined speeds.

4. An elastic bearing structure for mounting a substantially rotatable shaft, comprising a bearing and a hydraulic stabilizer for restoring said bearing automatically to its normal central position when it is being dislocated by a certain predetermined amount from its central position during the rotation of said shaft, said hydraulic stabilizer comprising a stationary housing, a resilient member, a ring mounted within said housing so as to be movable at least in a vertical direction within the plane of said bearing and resiliently enclosing and supporting said bearing in said direction by means of said resilient member surrounding said ring, a piston rod mounted on said ring and extending in a substantially vertical direction downwardly from said ring, a hydraulic cylinder, a control piston connected to said piston rod and slidably mounted in said cylinder, and means for hydraulically acting upon said piston for controlling the level of said ring relative to said stationary housing.

5. An elastic bearing structure as defined in claim 4, wherein said stabilizer is operative in two different directions vertically to each other.

6. An elastic bearing structure as defined in claim 4, further comprising disengageable spring-actuated hydraulic means for maintaining the location of said bearing in its central position when said shaft rotates at predetermined speeds.

7. An elastic bearing structure for mounting a rotatable shaft, comprising in combination an anti-friction bearing including a plurality of rolling elements and a cage therefor, and hydraulic stabilizer means for automatically restoring said bearing to its normal central position when said anti-friction bearing is being dislocated during the rotation of said shaft.

8. An elastic bearing structure as defined in claim 5, wherein said hydraulic stabilizer means is actuated only when said shaft is dislocated a predetermined amount and is effective in more than one direction.

9. An elastic bearing structure as defined in claim 4, wherein said control piston projects from said cylinder in both directions thereof, and wherein said hydraulic stabilizer further comprises a bushing on the free lower end of said piston rod and secured to said stationary housing, said piston rod having a socketlike bore therein extending in axial direction thereof, said bushing being slidably guided by the walls of said bore, said bushing and said piston having control apertures extending transversely of the axis of said piston, and a control slide axially slidable within said bushing, said bushing in cooperation with said transverse bores and said control slide being adapted to selectively conduct a hydraulic medium from one side to a point below or above the surface of said piston, and means for discharging said medium from the other side of said piston.

10. An elastic bearing structure as defined in claim 9, further comprising a ring enclosing said bearing, said piston rod comprising a slide rod, said control slide being mounted on the lower end of said slide rod and rigidly secured to said bearing ring by means of said slide rod.

11. An elastic bearing structure as defined in claim 4, further comprising an annular member enclosing said bearing and supporting the same and having brake surfaces thereon, a pair of brake rings on each side of said annular member and said ring in the direction of said shaft, means for guiding said brake rings for movement in said direction, spring means for urging said brake rings laterally and simultaneously in contact with said brake surfaces on said annular member for maintaining said bearing in its normal position.

12. An elastic bearing structure as defined in claim 11, further comprising a cylinder within said ring and extending parallel to said shaft, a pair of pistons having piston rods slidably guided within said cylinder, said piston rods projecting at opposite sides from said cylinder and from said ring and adapted to act upon said brake rings, said cylinder having a central opening into said cylinder intermediate said pistons for forcing said pistons outwardly and said piston rods against said brake rings so as to disengage said brake rings from contact with said annular member.

13. An elastic bearing structure as defined in claim 4, wherein a second control piston and hydraulic cylinder of a construction similar to said first piston and cylinder is mounted on said ring and at a right angle to said first piston and cylinder, said second piston having a piston rod and being adapted to return said bearing to its normal position when said bearing has been displaced in a lateral direction, said ring being connected with each of the piston rods of said pistons so as to be movable transversally in such a manner that the displacement of said ring permissible by one of said piston rods will not be transmitted to said other piston rod.

References Cited in the file of this patent

UNITED STATES PATENTS

| | | |
|---|---|---|
| 656,310 | Warburton | Aug. 21, 1900 |
| 1,499,332 | Baumann | July 1, 1924 |
| 2,584,770 | Wilcock | Feb. 5, 1952 |
| 2,660,485 | Gerard | Nov. 24, 1953 |
| 2,692,803 | Gerard | Oct. 26, 1954 |
| 2,729,518 | O'Connor | Jan. 3, 1956 |

FOREIGN PATENTS

| | | |
|---|---|---|
| 441,974 | Great Britain | Jan. 30, 1936 |